United States Patent [19]

Yamaguchi

[11] Patent Number: 4,573,079
[45] Date of Patent: Feb. 25, 1986

[54] SENSOR ARRAY DRIVING CIRCUIT
[75] Inventor: Shingo Yamaguchi, Atsugi, Japan
[73] Assignee: Ricoh Company, Ltd., Tokyo, Japan
[21] Appl. No.: 461,739
[22] Filed: Jan. 28, 1983
[30] Foreign Application Priority Data
  Jan. 29, 1982 [JP] Japan .................................. 57-13127
[51] Int. Cl.⁴ ............................................. H04N 3/14
[52] U.S. Cl. .................................................. 358/213
[58] Field of Search ........................................ 358/213
[56] References Cited
  U.S. PATENT DOCUMENTS
  4,314,279  2/1982  Yoshida ............................... 358/213
  4,453,187  6/1984  Komiya et al. ...................... 358/213

Primary Examiner—Michael A. Masinick
Attorney, Agent, or Firm—Guy W. Shoup

[57] ABSTRACT

A sensor array driving circuit includes a plurality of sensing elements arranged in the form of an array, which are commonly connected in a predetermined manner so as to reduce the number of leads or external wiring. The circuit includes a first plurality of transfer switches and a second plurality of transfer switches which are connected to the opposite sides of the sensor array. The circuit includes a single operational amplifier connected between the second plurality of transfer switches and the circuit output terminal. With such a structure, the sensing elements may be easily activated selectively and sequentially to carry out line scanning.

10 Claims, 6 Drawing Figures

Fig. 4(a)   Fig. 4(b)
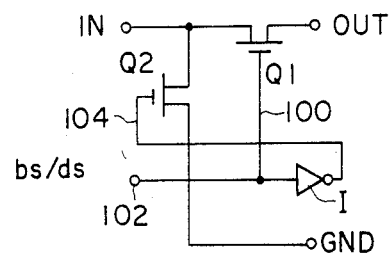
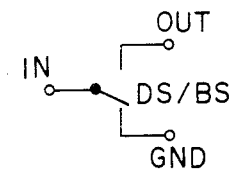
Fig. 5
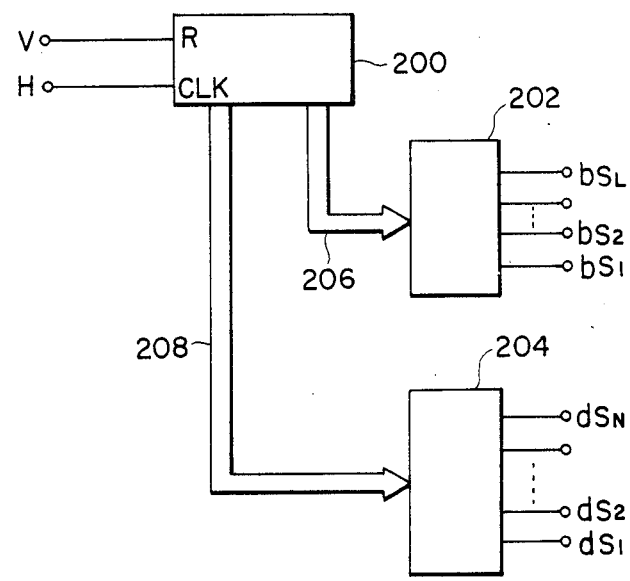

4,573,079

SENSOR ARRAY DRIVING CIRCUIT

BACKGROUND OF THE INVENTION

1. Field of the Invention

This invention relates to a sensor array driving circuit for driving an array of sensing elements, and, in particular to a sensor array driving circuit for driving a plurality of photoelectric elements, such as photodiodes, arranged in the form of an array in sequence to obtain a serial output signal converted from light image information.

2. Description of the Prior Art

A sensor array including an N×L plurality of photoelectric sensing elements which are grouped into an L plurality of blocks each having the same number, i.e., N, of the photoelectric sensing elements, an L plurality of common electrodes each connected to one end of each of the sensing elements of the corresponding block and an NxL plurality of individual electrodes which are individually connected to the other end of each of the sensing elements is known in the art ( N and L are positive integers). For example, in an image sensing device including a plurality of photoelectric sensing elements arranged in the form of a single array for use in a facsimile machine, the sensing elements arranged in the form of a single array are sequentially activated one at a time from one end to the other to carry out scanning along a single horizontal scanning line sector across the width of an original image which is being transported in a predetermined direction with respect to the sensor array. In this manner, the optically scanned light image information is converted into a serial, electrical image signal.

In such an image sensing device which includes commonly connected sensing elements in each block and which activates the sensing elements one at a time in a predetermined sequence, some measure must be taken to prevent the interactions between the sensing elements when activated from taking place. For example, in accordance with one prior art approach, provision is made of a plurality of switches, mechanical or electronical, which are selectively operated to carry out the required sequential activation, and an array of diodes are provided as connected to the sensing elements to prevent the interactions between the commonly connected sensing elements. Described more in detail, as shown in FIG. 1, this type of prior art image sensing device includes N×L number of photoelectric or sensing elements, such as photodiodes, $S_{11}$, $S_{12}$, . . . , $S_{LN}$ arranged in the form of one dimensional array 10, which is connected between a d.c. power supply E and ground through L number of make contacts $BS_1$-$BS_L$, N number of make contacts $DS_1$-$DS_N$ and L×N number of diodes $D_{11}$-$D_{LN}$. As shown, each of the individual electrodes connected to the cathodes of the diodes is connected to the corresponding individual electrodes of the other blocks, and the thus connected individual electrodes are connected to the output terminal $V_{out}$ through respective diodes $DO_1$-$DO_N$.

In the driving circuit of FIG. 1, one of the make, or normally open, contacts $BS_1$-$BS_L$ and one of the contacts $DS_1$-$DS_N$ are selectively closed to have one of the L×N sensing elements $S_1$-$S_{LN}$ activated at a time. The diodes $D_{11}$-$D_{LN}$ and $DO_1$-$DO_N$ function to block unwanted signals from entering into the selected sensing element. In such a prior art structure, it is obvious that (L+1)N number of such blocking diodes are required. However, providing such a large number of diodes in the sensor array 10 is rather complicated and difficult, which tends to push up the manufacturing cost.

FIG. 2 shows another prior art sensor array driving circuit including L×N number of sensing elements $S_{11}$, $S_{12}$, . . . , $S_{LN}$, arranged in the form of a single array 10. The sensing elements are divided into L number of blocks and the sensing elements in the same block are commonly connected at one end. These commonly connected ends are connected to L number of transfer switches $BS_1$-$BS_L$, each having its make contact connected to ground and its break contact connected to the d.c. power supply E.

On the other hand, the corresponding sensing elements, one in each of the blocks, are connected to each other at the other ends, which, in turn, are connected to the output terminal $V_{out}$ through respective operational amplifiers $A_1$-$A_N$ and make contacts $DS_1$-$DS_N$. This structure calls for the provision of N number of operational amplifiers $A_1$-$A_N$, each of which has its output connected to its inverting input through a feed back resistor $R_f$.

In operation, similarly with the case of the circuit shown in FIG. 1, the switches $BS_1$-$BS_L$ and the contacts $DS_1$-$DS_N$ are selectively operated to have one of the sensing elements activated so that an output signal, whose magnitude is inversely proportional to the electrical resistance of the selected sensing element, may be obtained at the output terminal $V_{out}$ through the corresponding operational amplifier. With such a structure, the sensing elements may be operated independently from each other without interactions with the other elements. In this second prior art approach, however, a relatively large number of operational amplifiers, which are rather complicated in structure, and the same number of feed back resistors must be provided, so that the overall circuit structure tends to be complex, large in size and expensive to make.

SUMMARY OF THE INVENTION

The disadvantages of the prior art are overcome and the present invention provides an improved sensor array driving circuit. In accordance with the present invention, there is provided a sensor array driving circuit for driving a plurality of sensing elements divided into blocks, said sensing elements having first ends commonly connected to corresponding block electrodes and second ends each connected to individual electrodes, the corresponding ones of said individual electrodes in different blocks being commonly connected, said driving circuit comprising: first selecting means connected to said block electrodes for selecting one of said block electrodes to be operative in sequence; second selecting means connected to said commonly connected individual electrodes for selecting one of said commonly connected individual electrodes to be operative in sequence while one of said block electrodes is selected for operation; and output means connected between said second selecting means and an output terminal of said driving circuit for supplying a signal from said sensor array to said output terminal serially.

Therefore, it is a primary object of the present invention to provide an improved sensor array driving circuit.

Another object of the present invention is to provide a sensor array driving circuit particularly suited to be used for driving an array of image sensing or photoelectric elements for optically reading an original document.

A further object of the present invention is to provide a sensor array driving circuit for use in a facsimile machine and the like.

A still further object of the present invention is to provide a sensor array driving circuit which is simple in structure, compact in size and thus easy to manufacture.

A still further object of the present invention is to provide a sensor array driving circuit which may be manufactured with increased yields.

A still further object of the present invention is to provide a sensor array driving circuit fast in operation and reliable in performance.

Other objects, advantages and novel features of the present invention will become apparent from the following detailed description of the invention when considered in conjunction with the accompanying drawings.

BRIEF DESCRIPTION OF THE DRAWINGS

FIG. 4(a) is a modification of the embodiment shown in FIG. 3 when use is made of MOS transistors as switches;

FIG. 4(b) is a schematic showing the switch which is used in the circuit of FIG. 3 and equivalent in function to the structure shown in FIG. 4(a); and FIG. 5 is a block diagram showing one example of a scanning control circuit which may be used in combination with the driving circuit of FIG. 3.

DESCRIPTION OF THE PREFERRED EMBODIMENTS

Figure 1:
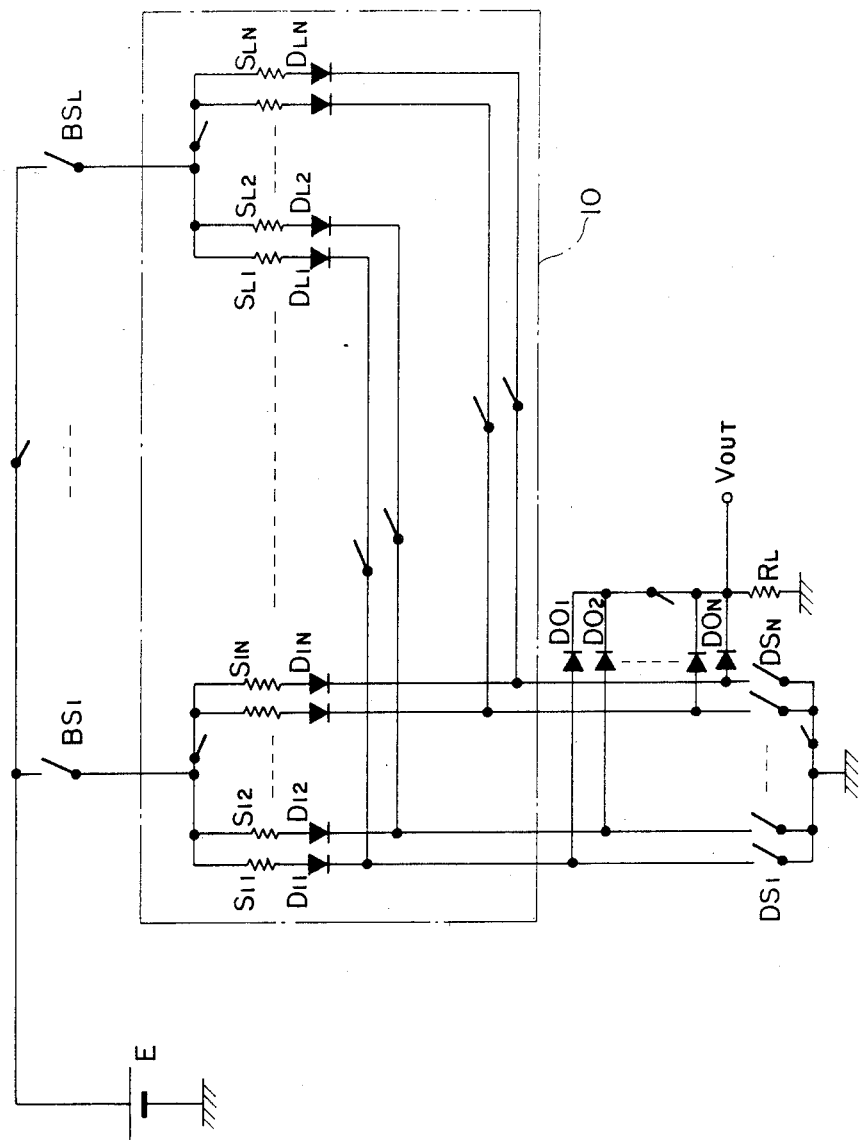
FIG. 1 is a circuit diagram showing one prior art sensor array driving circuit.
Figure 2:
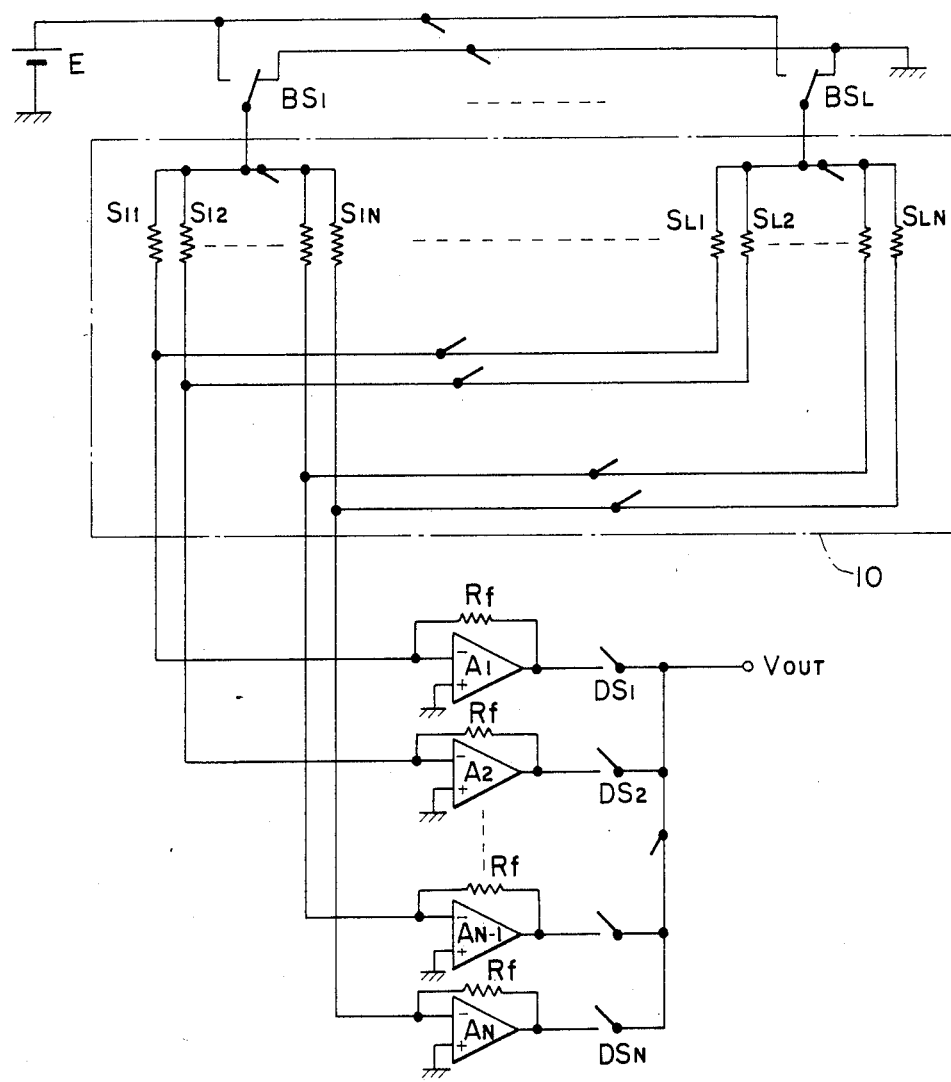
FIG. 2 is a circuit diagram showing another prior art sensor array driving circuit.
Figure 3:
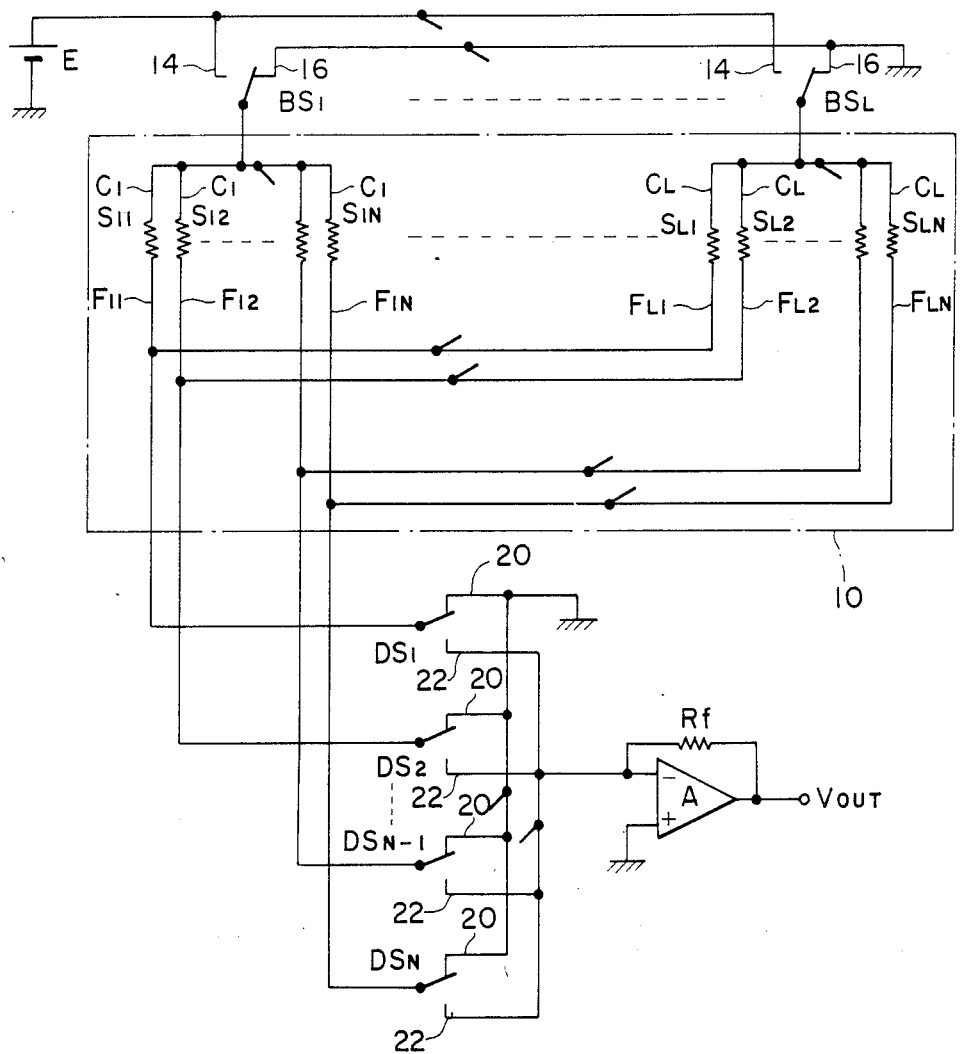
FIG. 3 is a circuit diagram showing one embodiment of the present invention.

Referring now to FIG. 3, there is provided one embodiment of the present sensor array driving circuit when applied to an image sensing device of a facsimile machine and the like for optically reading an original document to convert light image information into an electrical image signal. As shown, a sensor array 10 includes $L \times N$ number of photoelectric or light-sensing elements $S_{11}$-$S_{LN}$, such as photodiodes, which are arranged in the form of a single array defining a single scanning line sector, which is often called "main scanning sector." Accordingly, each of the sensing elements $S_{11}$-$S_{LN}$ corresponds to an image element. The sensing elements $S_{11}$-$S_{LN}$ are rendered operative or activated one at a time in sequence from one end to the other thereby completing one scanning along the main scanning sector.

The top end of each of the photoelectric elements $S_{ij}$ ($i=1-L$, $j=1-N$) in each block $1-L$ is commonly connected to the corresponding block electrode $C_i$ ($i=1-L$). These block electrodes $C_1$, $C_2$, ..., $C_L$ are connected to transfer switches $BS_1D$, $BS_2$, ... $BS_N$, respectively, each of which has a make contact 14, connected to the d.c. power supply E, and a break contact 16, connected to ground. Thus, L number of blocks each having N number of photoelectric elements are formed, and each of the blocks is selected for operation by having the corresponding transfer switch $BS_i$ ($i=1-L$) connected to the make or normally open contact 14 which is connected to the voltage source E. The bottom end of each of the photoelectric elements $S_{ij}$, from which photoelectric-converted signals are taken out, is connected to the corresponding individual electrodes $F_{ij}$. As shown, the corresponding ones of these individual electrodes $F_{ij}$ in different blocks are commonly connected. For example, the individual electrode $F_{12}$ belonging to block 1 is commonly connected to the individual electrode $F_{L2}$ belonging to block L and similarly to the other corresponding individual electrodes $F_{i2}$ belonging to the other blocks 2 through N-1. Then these commonly connected individual electrodes are connected to respective transfer switches $DS_j$ ($j=1-N$). For example, the corresponding individual electrodes $F_{11}$, $F_{21}$, $F_{31}$..., $F_{L1}$ are commonly connected and these commonly connected individual electrodes are also connected to the transfer switch $DS_1$. The other individual electrodes are similarly connected to each other and also the other transfer switches. As shown, each of the transfer switches $DS_1$, $DS_2$, ..., $DS_N$ has a break contact 20, which is connected to ground, and a make contact, which is connected to the inverting input of an operational amplifier A having its non-inverting input connected to ground and its output connected to a device output terminal and also to its inverting input through a feed back resistor $R_f$. In this manner, $L \times N$ number of sensing elements $S_{ij}$ are connected in the form of matrix, and the sensing elements $S_{ij}$ may be selectively activated one at a time by controlling the operation of the block selection switches $BS_1$, $BS_2$, ..., $BS_L$ and of the data selection switches $DS_1$, $DS_2$, ..., $DS_N$.

It is true that the switches $BS_i$ and $DS_j$ may be formed by any mechanical, electrical or electronical switches. However, it is preferable that these switches be formed by semiconductor devices such as MOS (Metal-Oxide-Semiconductor) transistors. One such example using MOS transistors is illustrated in FIG. 4(a), and it includes a pair of MOS transistors Q1, Q2 and an inverter I, as shown. The MOS transistor Q1 has its source and drain connected between an input terminal IN and an output terminal OUT and its gate 100 connected to a control terminal 102 and also to the input of the inverter I. On the other hand, the MOS transistor Q2 has its source and drain connected between the input terminal IN and ground GND and its gate 104 connected to the output of the inverter I. It will be easily understood that the switch circuit shown in FIG. 4(a) is functionally equivalent to the transfer switch shown in FIG. 4(b).

When a scanning signal bs or ds is supplied to the control terminal 102, the MOS transistor Q1 is turned on to form a conductive channel between the input IN and output OUT terminals. Besides, the signal bs or ds, after having been inverted by the inverter I, is supplied to the gate of the MOS transistor Q2 to cause it to be off, thereby disconnecting the input terminal IN from ground. Such a situation may be indicated by having the switch changed to be connected to the output terminal OUT. Upon termination of the scanning signal bs or ds to the control terminal 102, the MOS transistor Q1 is turned off to disconnect the input terminal IN from the output terminal OUT; whereas, the MOS transistor Q2 is turned on thereby connecting the input terminal IN to ground. This situation corresponds to the state of the switch shown in FIG. 4(b).

When the switching circuit of FIG. 4(a) is to be used as the switches $BS_1$, $BS_2$, ..., $BS_L$, of the sensor array driving circuit of FIG. 3, the input IN and output OUT terminals of each switching circuit should be connected to the block electrode $C_i$ and the make contact 14 of the corresponding block. On the other hand, when used as the switches $DS_1, DS_2, \ldots, DS_N$, the input IN and output OUT terminals of each should be connected to the corresponding commonly connected individual electrodes F and the make contact 22.

FIG. 5 shows in block diagram a scanning control circuit which supplies scanning signals bs and ds. As shown, the scanning control circuit includes a binary counter 200 and a pair of decoders 202 and 204. The counter 200 counts up by receiving a horizontal synchronization signal H at its clock terminal CLK and supplies its count as parallel outputs 206 and 208. When the counter 200 receives a vertical synchronization signal V at its reset terminal R, its count is reset to an initial value. In the present embodiment, the counting is carried out up to the value of $L \times N$, which is the total number of picture elements present in a horizontal scanning line sector.

The decoder 202 is for supplying a block selection signal bs, and, for example, it decodes the upper digits of the count supplied from the counter 200 to supply one of the block selection signals $bs_1, bs_2, \ldots, bs_L$ to the corresponding switch $BS_i$ for causing the corresponding block electrode $C_i$ to be selected for operation. On the other hand, the other decoder 204 is for supplying a data selection signal ds, and, for example, it decodes the lower digits of the count supplied from the counter 200 to supply one of the data selection signals $ds_1, ds_2, \ldots, ds_N$ to the corresponding switch $DS_j$ for causing the corresponding individual electrode $F_{ij}$ to be selected for operation. These control signals $bs_1, bs_2, \ldots, bs_L$ and $ds_1, ds_2, \ldots, ds_N$ output from the decoders 202 and 204, respectively, are supplied to the control terminal 102 shown in FIG. 4(a).

In operation, when the vertical synchronization signal V is applied to the reset terminal R of the counter 200, the count of the counter 200 is reset, and, then, it starts counting by receiving a series of horizontal synchronization signals H at its clock terminal CLK. The decoders 202 and 204 decode the count values supplied as outputs 206 and 208, respectively, from the counter 200, and, in the first place, supply signals $bs_1$ and $ds_1$. Accordingly, the switches $BS_1$ and $DS_1$ are operated to establish connection with the make contacts 14 and 22, respectively, so that the sensing element $S_{11}$ is selected for operation and thus operatively connected to the power supply E and also to the inverting input of the operational amplifier A. At this time, the other sensing elements $S_{12}, \ldots, S_{1N}$ in the same block which is connected to the switch $BS_1$ are maintained at the nonselected state because their switches $DS_2, \ldots, DS_N$ are kept connected to ground through their break contacts 20. Moreover, the remaining sensing elements $S_{21}-S_{LN}$ are all maintained inoperative because their block electrodes $C_2-C_L$ are all connected to ground through the associated block selection switches $BS_2-BS_L$. As a result, the output $V_{out}$ from the op amp A may be expressed by a voltage which is determined only the current electrical resistance of the sensing element $S_{11}$ now selected for operation as follows:

$$V_{out} = -ER_f/r_{11}.$$

When the next following horizontal sync signal H is applied, the counter 200 counts up by one, so that the data selection decoder 204 now supplies the signal $ds_2$ instead of the previous signal $ds_1$. Under the circumstances, since the block electrode selection decoder 202 still supplies the signal $bs_1$, the next sensing element $S_{12}$ is now selected for operation. Thus, the op amp A now supplies its output, which is inversely proportional to the current electrical resistance $r_{12}$ of the element $S_{12}$, in a manner similar to the case of the element $S_{11}$. In this manner, after all of the sensing elements $S_{11}-S_{1N}$ have been selected for operation in sequence in synchronism with the horizontal sync signal H, the decoder 202 supplies the signal $bs_2$ instead of $bs_1$ at the time when the next horizontal sync signal H is applied. This then causes the first sensing element $S_{21}$ of the second block to be activated, and the similar operation is repeated for the remaining sensing elements up to the element $S_{LN}$. Therefore, the op amp A supplies at its output the voltage $V_{out}$ which is inversely proportional to the current electrical resistance of the sensing elements $S_{11}-S_{LN}$ serially to form a serial image signal corresponding to a single scanning line sector. Then upon application of the next vertical sync signal V, the counter 200 is reset to be set ready for the next cycle of scanning operation.

With the above-described structure, the present image sensing array driving circuit uses only a single operational amplifier and it does not require a matrix of diodes or a plurality of operational amplifiers, and, therefore, the present invention is extremely simple in structure and easy to make. Moreover, since only one operational amplifier is used, it is not susceptible to disadvantages incurred by differences in device characteristics which happens all the time when a number of the same devices are used. It will be easily understood that the switching circuits when formed by MOS transistors, as shown in FIG. 4(a), may be integrally manufactured with the scanning control circuit of FIG. 5, which includes the counter 200 and the decoders 202 and 204, in a single LSI chip. In this case, the LSI chip may be easily mounted on the substrate on which the sensor array is formed by using a well-known bonding technique. This allows to obtain a high density sensor assembly of extremely compact in size with fewer number of leads. Such a compact and high integration sensor assembly is particularly suitable to be used as a scanning device of a facsimile machine and the like.

While the above provides a full and complete disclosure of the preferred embodiments of the present invention, various modifications, alternate constructions and equivalents may be employed without departing from the true spirit and scope of the invention. For example, the present invention may be applied to other sensing devices than light sensing or image sensing devices as described above. Besides, the present invention is not limited only to be used for driving one dimensional array, but it may be used for a sensor array of any dimensionality. Therefore, the above description and illustration should not be construed as limiting the scope of the invention, which is defined by the appended claims.

What is claimed is:

1. A sensor array driving circuit for driving a plurality of sensing elements divided into blocks, said sensing elements having first ends commonly connected to corresponding block electrodes and second ends each connected to individual electrodes, the corresponding ones of said individual electrodes in different blocks being commonly connected, said driving circuit comprising:

first selecting means connected to said block electrodes for selecting one of said block electrodes to be operative in sequence;

second selecting means connected to said commonly connected individual electrodes for selecting one of said commonly connected individual electrodes to be operative in sequence while the corresponding one of said block electrodes is selected for operation; and output means connected between said second selecting means and an output terminal of said driving circuit for supplying a signal from said sensor array to said output terminal serially.

2. A circuit of claim 1 wherein said first selecting means includes a first plurality of transfer switches each of which is connected to the corresponding block electrode and each of which has a break contact connected to a first reference voltage and a make contact connected to a second reference voltage.

3. A circuit of claim 2 wherein said first reference voltage is ground voltage and said second reference is a predetermined voltage different from ground voltage.

4. A circuit of claim 2 wherein each of said transfer switches is comprised of semiconductor devices.

5. A circuit of claim 4 wherein said semiconductor devices include a pair of MOS transistors and an inverter.

6. A circuit of claim 2 wherein said second selecting means includes a second plurality of transfer switches each of which is connected to the corresponding individual electrodes in the different blocks and each of which has a break contact connected to a third reference voltage and a make contact connected to the input of said output means.

7. A circuit of claim 6 wherein said third reference voltage is ground voltage.

8. A circuit of claim 7 wherein said output means includes an operational amplifier having its inverting input connected from the make contact of each of said second plurality of transfer switches, its non-inverting input connected to ground and its output connected to said circuit output terminal and also to said inverting input through a feed back resistor.

9. A circuit of claim 1 further comprising a scanning control circuit which is operatively connected to supply control signals for said first and second selecting means for driving said sensor array in a predetermined sequence.

10. A circuit of claim 9 wherein said scanning control circuit includes a counter which receives vertical and horizontal synchronization signals, a first decoder connected to receive a first count value from said counter and to supply block electrode selection signals to said first selecting means and a second decoder connected to receive a second count value from said counter and to supply data selection signals to said second selecting means whereby said first and second selecting means selectively causing said sensing elements activated in sequence one at a time.

* * * * *